US00RE43221E

(19) United States
(12) Reissued Patent
James et al.

(10) Patent Number: US RE43,221 E
(45) Date of Reissued Patent: Mar. 6, 2012

(54) STRUCTURED CABLING SYSTEM AND METHOD

(75) Inventors: Jason Lee James, Northampton (GB); Richard Weatherley, Northamptonshire (GB)

(73) Assignee: Hellermanntyton Data Limited, Brackmills, Northampton (GB)

(21) Appl. No.: 12/631,979

(22) Filed: Dec. 7, 2009

Related U.S. Patent Documents

Reissue of:
(64) Patent No.: 7,375,282
Issued: May 20, 2008
Appl. No.: 10/515,585
PCT Filed: Dec. 11, 2003
PCT No.: PCT/GB03/05387
§ 371 (c)(1),
(2), (4) Date: Dec. 22, 2004
PCT Pub. No.: WO2004/054058
PCT Pub. Date: Jun. 24, 2004

(30) Foreign Application Priority Data

Dec. 11, 2002 (GB) ..... 0228929.6

(51) Int. Cl.
*H01R 4/00* (2006.01)

(52) U.S. Cl. ..... 174/84 R; 174/84 S

(58) Field of Classification Search ..... 174/74 R, 174/74 A, 75, 77 R, 84 R, 84 S, 88 R, 93, 174/94 R, 94 S
See application file for complete search history.

(56) References Cited

U.S. PATENT DOCUMENTS 4,061,411 A 12/1977 Gumb et al.
4,434,528 A 3/1984 Lucius et al.
4,655,521 A * 4/1987 Thomas ..... 439/174
4,678,251 A 7/1987 Willard
4,684,211 A 8/1987 Weber et al.
4,894,024 A 1/1990 Debortoli et al.
4,906,196 A 3/1990 Bowman et al.
(Continued)

FOREIGN PATENT DOCUMENTS

EP 0 234 419 9/1987
(Continued)

OTHER PUBLICATIONS

"Ortronics: Unique work-station solution provides flexibility for EMAP publishing's computer network." M2 Presswire. (Mar. 1, 1999).

(Continued)

*Primary Examiner* — William Mayo, III
(74) *Attorney, Agent, or Firm* — Brinks Hofer Gilson & Lione

(57) ABSTRACT

A structured cabling system includes a plurality of data cables (6A-6F), one end of each cable being secured to a jack of a multiple jack assembly (1) and the other end of each cable being secured to an individual jack (9A-9F) located within a protective enclosure (11). The individual cables are mechanically secured to at least the protective enclosure (11) and/or a strain relief member (8) within the cable bundle is secured to the protective enclosure (11). The entire assembly may be pre-formed under factory conditions and delivered to an installation site. The multiple jack assembly (1) may then be secured, preferably by snap-fitting, to a rack assembly and the protective enclosure (10) may be used to draw the entire cable length to the required position. Once the cable is in position the protective enclosure (10) is discarded and the jack secured to their final use positions. In an alternative embodiment the protective enclosure forms a housing for jacks (9A-9F) in their final use position and may, for example, be snap-fitted to a floor box for this purpose.

13 Claims, 3 Drawing Sheets

U.S. PATENT DOCUMENTS

| | | | | | |
|---|---|---|---|---|---|
| 4,909,757 | A | | 3/1990 | Reed | |
| 5,074,801 | A | | 12/1991 | Siemon | |
| 5,083,941 | A | | 1/1992 | Rodgers et al. | |
| 5,199,891 | A | | 4/1993 | Reed | |
| 5,238,426 | A | | 8/1993 | Arnett | |
| 5,366,388 | A | | 11/1994 | Freeman et al. | |
| 5,370,541 | A | | 12/1994 | Bossard | |
| 5,378,166 | A | | 1/1995 | Gallagher | |
| 5,447,441 | A | | 9/1995 | Mueller et al. | |
| 5,460,545 | A | | 10/1995 | Siemon et al. | |
| 5,531,611 | A | | 7/1996 | Reed et al. | |
| 5,647,043 | A | * | 7/1997 | Anderson et al. | 385/78 |
| 5,804,765 | A | * | 9/1998 | Siemon et al. | 174/651 |
| 5,807,139 | A | * | 9/1998 | Volansky et al. | 439/638 |
| 5,902,155 | A | | 5/1999 | Polgar et al. | |
| 6,017,238 | A | * | 1/2000 | Johnston | 439/404 |
| 6,109,978 | A | | 8/2000 | Stellman et al. | |
| 6,135,796 | A | * | 10/2000 | Wilson et al. | 439/215 |
| 6,168,458 | B1 | * | 1/2001 | Kraft | 439/488 |
| 6,206,711 | B1 | | 4/2001 | Snow et al. | |
| 6,210,216 | B1 | | 4/2001 | Tso-Chin et al. | |
| 6,267,628 | B1 | | 7/2001 | Meckley et al. | |
| 6,325,650 | B1 | * | 12/2001 | Wilson et al. | 439/215 |
| 6,358,091 | B1 | | 3/2002 | Lo et al. | |
| 6,366,671 | B1 | | 4/2002 | Beavers | |
| 6,375,491 | B1 | * | 4/2002 | Durand et al. | 439/418 |
| 6,416,399 | B2 | | 7/2002 | Hembree | |
| 6,482,039 | B2 | | 11/2002 | Phommachanh et al. | |
| 6,483,902 | B1 | | 11/2002 | Stewart et al. | |
| 6,537,106 | B1 | | 3/2003 | Follingstad | |
| 6,720,495 | B2 | | 4/2004 | Castellani et al. | |
| 6,974,911 | B2 | * | 12/2005 | Hyde | 174/74 R |
| 7,044,777 | B1 | | 5/2006 | Daly et al. | |
| 2003/0022553 | A1 | | 1/2003 | Chen et al. | |

FOREIGN PATENT DOCUMENTS

| | | |
|---|---|---|
| EP | 1098408 | 5/2001 |
| GB | 684146 | 12/1952 |
| GB | 2 260 034 | 3/1993 |
| JP | 54-146388 | 11/1979 |
| JP | 6-068341 | 9/1994 |
| JP | 8-308065 | 11/1996 |
| JP | 9-19010 | 1/1997 |
| JP | 9-093766 | 4/1997 |
| JP | 10-144426 | 5/1998 |
| JP | 2002134233 | 5/2002 |
| WO | 97/44863 | 11/1997 |

OTHER PUBLICATIONS

Patent Abstracts of Japan No. 2000067 of N. Takashi et al., "Split Type Unit Cable" of JP 10237490, Aug. 24, 1998.

* cited by examiner

STRUCTURED CABLING SYSTEM AND METHOD

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application claims the benefit of International Application No. PCT/GB03/05387 filed on Dec. 11, 2003, which claims the benefit of GB Application 0228929.6 filed on Dec. 11, 2002. The disclosures of the above applications are incorporated herein by reference. This application is a reissue of U.S. Pat. No. 7,375,282, which issued on May 20, 2008, the disclosure of which is incorporated herein by reference.*

BACKGROUND OF THE INVENTION

1. Field of the Invention

This invention relates to a structured cabling system and to a structured cabling method for installing structured cabling into a building.

2. The Prior Art

Structured cabling systems for distribution of voice and data information around a building are well known. Typically, a Category 5 ("Cat 5") or Category 5e ("Cat 5e") system will comprise one or more rack mounted patch panels, each having a plurality of RJ45 jacks. Each jack of each patch panel will have connected thereto a length of data cable. Each length of data cable, at the end remote from the patch panel, will have connected thereto a jack which is typically mounted in a floor box or wall outlet.

Conventionally, installation of a structured cabling system as described above is carried out by first running lengths of cable, cut from reels of cable, between each position where a floor or wall outlet is required, and a comms room. The cables are temporarily labeled for identification purposes. Cable installation is typically carried out at an early stage of building fit-out and can be done by unskilled staff. At a late stage in the fit-out, a rack system is installed in the comms room. The cable ends in the comms room are cut to length and each cable is terminated to the correct jack on a patch panel, taking account of the cable labeling previously provided. The far end of each cable is then terminated to a jack in a floor or wall box and each cable and its connections is tested. Any faults are rectified and the patch panels are then fixed to the rack.

The existing method of installing structured cabling, as outlined above, has a number of well recognized disadvantageous. Notably, termination of the cable to the patch panel and remote jack is somewhat problematic under site conditions. Skilled personnel are required to make the necessary terminations reliably, and if the terminations do not meet the test standard, re-termination is required. The time required on site to install the structure cabling system is considerable, resulting in general inconvenience and cost. On-site testing is difficult and time-consuming. These problems are significant when the installation is to Cat 5 or Cat 5e standards. However, the problem becomes considerably worse if the installation is to Category 6 ("Cat 6") standard or is a fibre optic installation because of the greater difficulties in obtaining the required quality of termination under site conditions for these systems.

SUMMARY OF THE INVENTION

We have now devised an arrangement which overcomes many of the difficulties and shortcomings outlined above. The preferred embodiment of the present invention provides a structured cabling system in which all the required termination and testing is carried out under factory conditions. Forming terminations to the required standard under factory conditions is substantially easier than attempting to carry out termination to the required standard under site conditions. Further, performance testing carried out under factory conditions is considerably quicker and more accurate than is possible using field equipment. If any rectification is required, this is easier to carry out under factory conditions than under field conditions. On site installation is considerably quicker and can be carried out by unskilled or semi skilled personnel.

In accordance with a first aspect of the present invention a structured cabling system comprises: a plurality of cables each terminated to a multiple jack assembly which includes an individual jack for each of the data cables; an individual jack terminated to each data cable at the end thereof remote from the jack module; and a protective enclosure surrounding the terminations the individual jacks to protect them from accidental damage during installation.

In one embodiment of the invention the protective enclosure and/or the multiple jack assembly is connected to the cables by a mechanical connection which [pet;] *permits* the cables to be pulled by pulling the protective enclosure or multiple jack assembly, as the case may be.

In one embodiment of the invention, the data cables are laid around a [stain] *strain* relief member to form a composite cable. With such an arrangement a complete assembly comprising the multiple jack assembly, the data cables, the individual jacks and the protective enclosure may be assembled under factory conditions and transported as a unit to a site. At the site, the multiple jack assembly may be secured to a rack and the protective enclosure used to draw the cable through the building to a position adjacent the required position of the individual jacks. The protective enclosure may then be removed and the individual data cables unlaid to provide for the necessary positioning of the individual jacks in their wall mounted or floor mounted outlets. In the alternative the individual jacks may be mounted to a single outlet structure, for example a single floor box. In one embodiment of the invention the protective enclosure is not removed at the end of the installation procedure, but rather remains in place to protect the terminations to the individual jacks. Under these circumstances, the individual jacks and the protective enclosure may together be secured as by snap fitting to a purpose designed wall or floor box to provide a plurality of adjacent individual jacks. The entire operation may be completed without affecting the termination of the data cables and without applying mechanical [stain] *strain* to the connections.

If a [stain] *strain* relief member is employed it may also be anchored to the body of the multiple jack assembly. If this is done, the cable may be drawn in the opposition direction—i.e. from the wall or floor outlet to the comms room by applying a drawing force to the multiple jack assembly.

Preferably, a housing is provided for receiving a plurality of multiple jack assemblies, the arrangement being such that when multiple jack assemblies are in position, the resultant combination of housing and multiple jack assemblies has an appearance similar to that of a conventional rack-mounted patch panel. Preferably, the multiple jack assemblies snap-fit into the housing and can easily be released from the housing, for examples by depressing a release latch. Preferably, the multiple jack assemblies comprise an enclosure which encloses the jacks and termination fittings and is secured to the composite cable to ensure strain relief.

In a particularly preferred arrangement the multiple jack assemblies are connected to the housing, by offering up multiple jack assemblies to the rear of the housing and clipping them in position. Accordingly, it is not necessary to feed the individual jacks, the protective enclosure or the data cable through the rack-mounted housing.

In one embodiment of the invention both ends of the cable assembly are terminated in a multiple jack assembly. The multiple jack assemblies may be identical to each other. With such an arrangement the multiple jack assemblies maybe snapped into position into carriers in respective rack assemblies so as to provide interconnected patch panels which may be within the same or different comms rooms or cabinets.

The invention will be better understood from the following description of a preferred embodiment thereof, given by way of example only, reference being had to the accompany drawings.

DETAILED DESCRIPTION OF THE PREFERRED EMBODIMENT

Figure 1:
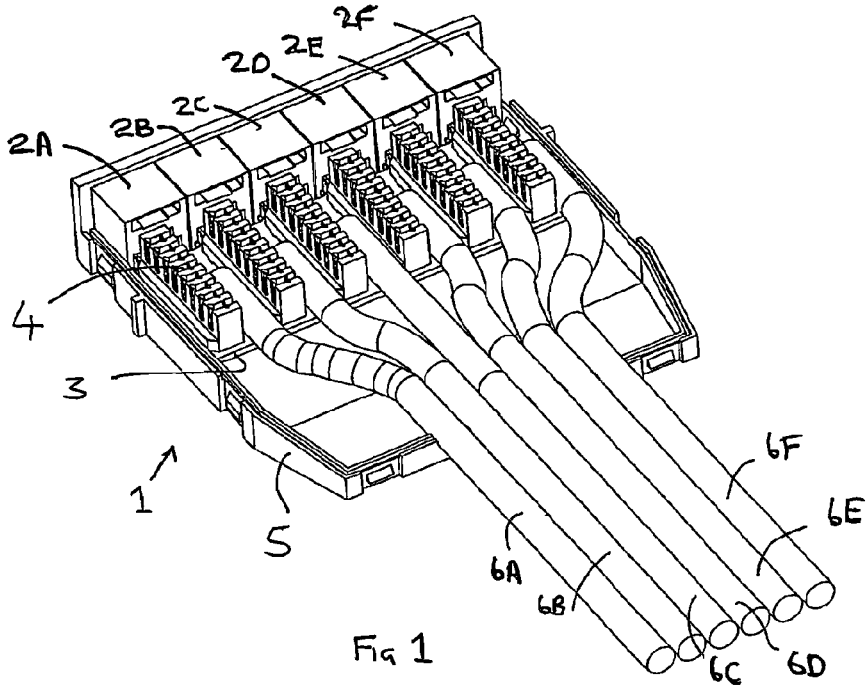
FIG. 1 illustrates in perspective a multiple jack assembly having a plurality of data cables connected thereto, one part of the assembly casing being removed in the interests of clarity.

Referring firstly to FIG. 1 there is illustrated a multiple jack assembly 1 comprising six individual jacks 2A-2F. Each jack is mounted on a printed circuit board (PCB) 3 and is provided with a respective [integrated desktop connector] *insulation displacement connector* (IDC [connector]) 4. The jacks and PCB are mounted within a casing 5, only the base of which is shown in FIG. 1. In use, the casing 5 will also include a cover which is a snap-fit with the base so as to enclose the jacks, the PCB and IDC connectors. The snap-fit between the base and the cover of the casing may grip the individual data cables 6A-6F to provide strain relief. Alternatively, the individual cables may be clamped to the base by suitable clamping means. Six data cables 6A-6F are terminated to respective IDC connectors of the jacks 2A-2F to the standard required (typically Cat 5, Cat 5e or Cat 6) by the installation in question, such that the eight individual wires in each data cable are connected to respective contacts of the jack to which the data cable is connected. As usual, each jack will accept a separate plug (e.g., an RJ45 plug) so that the wires in each plug become electrically connected exclusively to associated wires in the jack in which it is inserted. The termination, and the securing of the casing cover to the casing base are completed under factory conditions.

Figure 2:
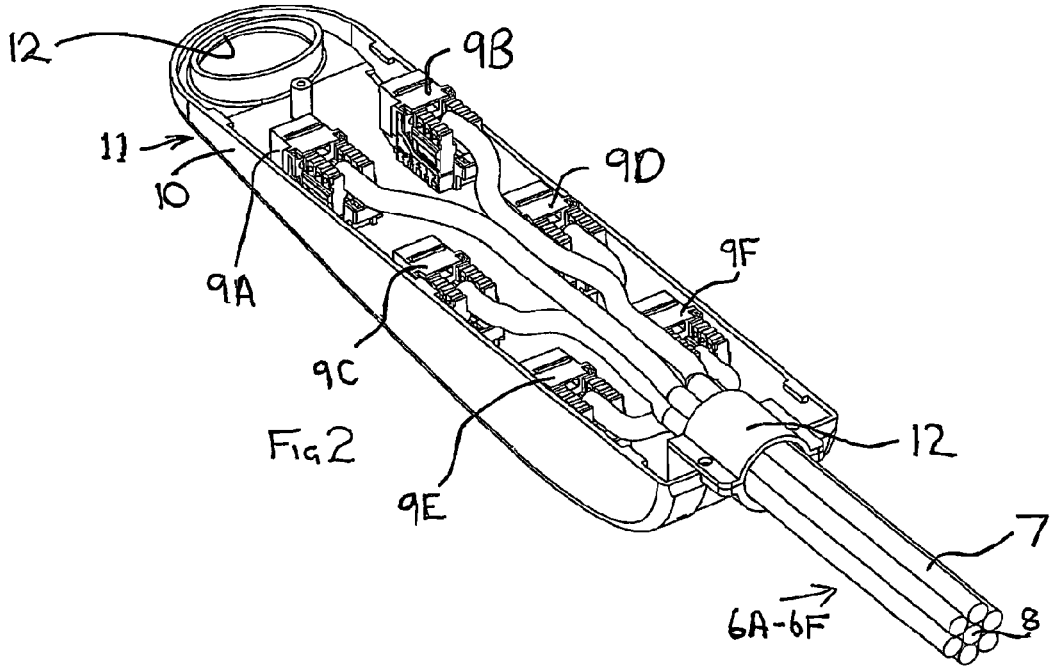
FIG. 2 shows a plurality of individual jacks connected to a composite data cable and mounted within the base of a protective enclosure, the top of the protective enclosure being omitted in the interests of clarity.

Referring now to FIG. 2, the end regions of the data cables 6A-6F remote from that illustrated in FIG. 1 is shown. It will be noted that the individual cables are formed into the composite cable 7 which preferably in addition to the individual cables 6A-6F includes a central strain relief element 8. The individual data cables 6A-6F are respectively terminated to individual jacks 9A-9F via associated IDC connectors. The individual jacks are located and optionally temporarily secured within the base 10 of a protective enclosure 11. The composite cable 7 is secured to the base by means of a clamp 12 to ensure stress relief. Additionally or alternatively, the strain relief element 8 may be secured to the base 10 of the protective enclosure to provide strain relief. This strain relief element 8 may optionally be secured to the casing 5 of the possible jack assembly 1 to provide strain relief at that point.

In use, the protective enclosure 11 would be closed by means of a cover which forms a snap-fit with the base 10. The enclosure protects the individual jacks 9A-9F and allows strain to be applied to the composite cable without applying strain to the terminations of the individual cables to the IDC connectors. Preferably, a pulling eye 12 is formed in the protective enclosure to allow a pulling rope to be attached to the protective enclosure. Alternatively, if appropriate strain relief is provided at the multiple jack assembly end, a pulling rope may be attached to the multiple jack assembly to enable the multiple jack assembly to be pulled towards its eventual location.

The exact point at which the individual data cables 6A-6F are formed into the composite cable 7 will depend on the nature of the data installation in question. However, over [he] *the* majority of the distance between the multiple jack assembly 1 and the protective enclosure 11 the cables will be in the form of a single composite cable to facilitate easy handling of the complete assembly. In some instances, the act of laying the individual cables will form a composite cable of the required structural integrity. However, in general it is envisaged that some means would be provided for holding the composite cable in its composite form. Such means may, for example include over-wrapping of the cable with a suitable film material. The means used for holding the cable into its composite form will be chosen having due regard to the need to be able to bend the composite cable without imposing undue strain on any one individual cable within the composite.

Termination of the individual data cables to the individual Jacks 9A-9F, i.e., the connection of the individual wires in the data cables to respective contacts of the jacks, and subsequent testing, is accomplished under factory conditions.

Figure 4:
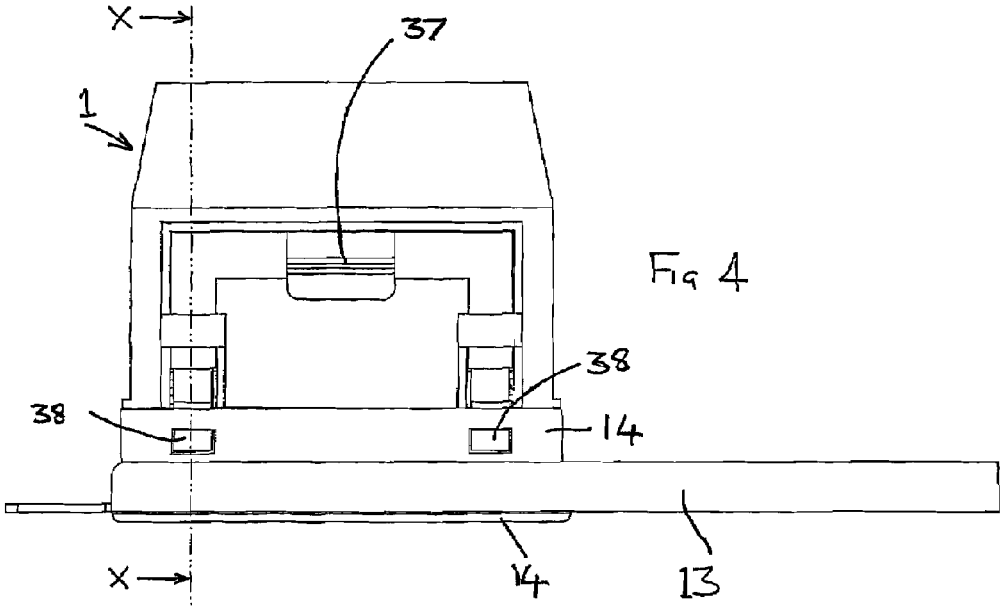
FIG. 4 shows a multiple jack assembly mounted in a housing.
Figure 5:
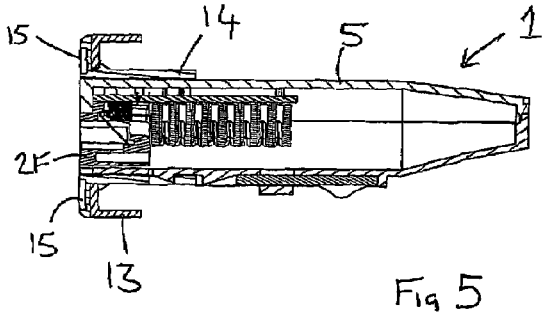
FIG. 5 is a cross-section along the line X-X of FIG. 4.

Once a complete cabling assembly comprising multiple jack assembly, data cables, individual jacks and protective enclosures has been formed and tested under factory conditions, it will be transported to site. To this end, a carrier is preferably provided. The carrier preferably includes a drum for receiving the data cables and means for accommodating and holding the multiple jack assembly and the protective enclosure. Several complete cable assemblies may be mounted on the same delivery device depending on their length. The carrier is transported to site by any suitable means, for example, road transport, and is taken to the general area where the structured cabling installation is required. In general, a rack arrangement will be provided in a comms room or cabinet. In the case of the preferred embodiment of the present invention, the rack is provided with a plurality of individual housings 13 (FIG. 4) into each of which several multiple jack assemblies can be mounted. The required mounting is preferably obtained by offering the multiple jack assembly 1 up to the rear of the housing 13. In the preferred embodiment of the invention a plastic adaptor 14, which may incorporate labeling facilities 15, is offered up to the housing 13 from the front thereof, and the multiple jack assembly 1 is then pushed into snap-fit engagement with the adaptor 14 from the rear of the housing. This arrangement is illustrated in FIG. 5. A release lever 37 is provided which will enable the multiple jack assembly to be released from its associated housing by sliding the release lever to disengage the snap-fit latches 38. The fact that the multiple jack assembly can be offered up to the housing 13 from the rear thereof, combined with the above described latching arrangement, and the sliding release lever, greatly assist installation and removal of the multiple jack assembly from the comms cabinet. It will be appreciated that in a complete structured cabling installation many cables will be located within the comms cabinet and the facility easily to insert and release an individual multiple jack assembly from the rear is of considerable value. The latch 38 and sliding release lever 37 arrangement may, in fact, be of general utility in applications other than the structured cabling assembly described herein.

Figure 3:
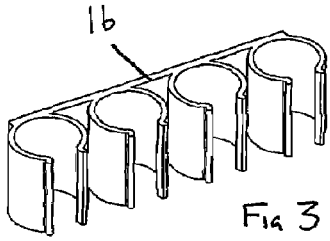
FIG. 3 illustrates a clip for use in connection with the system of the present invention.

Having snap-fitted a multiple jack assembly 1 into tie correct position in the associated housing 13, the data cables are guided through the communication enclosure by conventional means or by use of special purpose clips 16 as illustrated in FIG. 3. The remainder of the cable assembly, including the individual jacks 9A-9F is then hauled through the building structure to a point adjacent to the required final position of the jacks (9A-9F). The protective enclosure is then removed and the individual data cables unlaid from the composite cable to bring the jacks to their required final position. The jacks will then be snap-fitted into appropriate mounting in floor or wall boxes.

It will be appreciated that the entire data installation process, as outlined above, can be effected on site without disturbing the terminations between the data cables and their associated jacks. Further, no on-site testing of the completed installation is necessary.

Although in general it will be desirable to start the cable laying exercise from the comms cabinet/comms room by installing the multiple jack assembly to its associated housing and then laying the cable to the required position, it is to be understood that under certain circumstances it may be desirable to start the cable laying exercise at the individual jack end of the assembly and lay the cable to the comms cabinet/comms room where the multiple jack assembly is secured in position.

In one embodiment of the invention the data cables are provided in pairs connected together on a common line in a generally "8" shaped cross-sectional arrangement. In order to provide the six cables of the illustrated embodiment of the invention, three such double "8" cables are laid around the strain relief member 8. The resultant bundle may be secured together by any appropriate means, for example, adhesive bonding or binding. In the case of a six cable arrangement as illustrated, the three different "8" shaped cable pairs may be of different colours. One data cable of each pair preferably includes an appropriate indicator, for example a continuous or near continuous line of printed text. By this means each individual jack 9 can readily be associated with a particular one of the jacks of the multiple jack assembly by visual inspection.

In an alternative embodiment of the invention six individual cables are laid about a central strain relief member. The individual cables can be of any suitable type. Preferably, the cables are provided with end-to-end identification means, for example in the form of a continuous printed legend on each cable or in the form of coloured or raised identification strips or bumps. This will assist in identifying which jack of the multiple jack assembly is connected to which of the individual jacks at the remote end of the cable assembly. However, use of identifying characteristics on the cables is not essential if all termination is carried out under factory conditions. Preferably, each of the jacks has associated therewith indicia which may be used to identify which of the jacks at the multiple jack assembly is connected to which of the jacks at the remote end of the structured cable assembly. The indicia may be in the form of a labeling system. Preferably, the label or labels of the multiple jack assembly are visible from the rear of the assembly so that they can be viewed from the rear of the comms cabinet.

In some applications, for example those using Cat 6 cable, it may be desirable to position the individual cables within the bundle to reduce alien cross-talk. For example, it may be desirable to lay the cables in an A-B, A-B, A-B sequence around the strain relief member.

Figure 6:
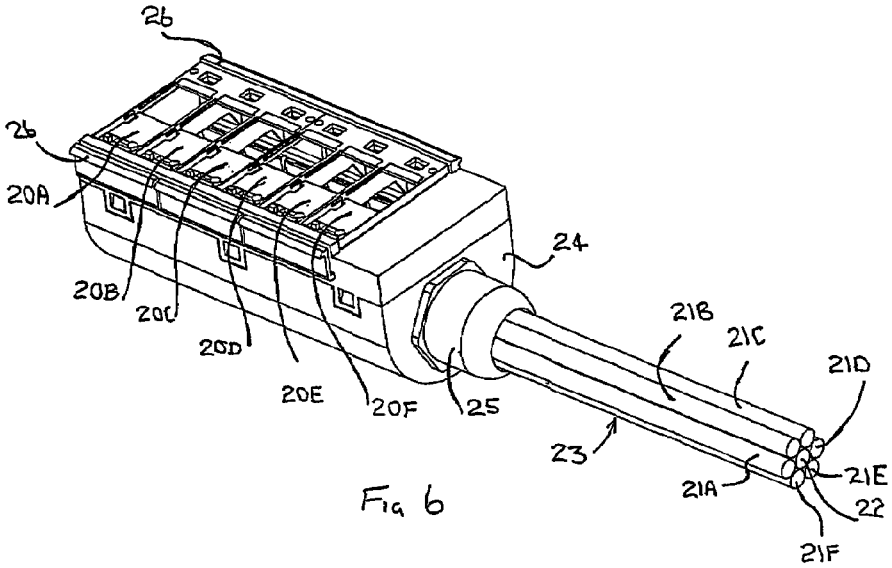
FIG. 6 shows an alternative arrangement for the end of the cabling system remote from the multiple jack assembly.

Referring now to FIG. 6 an alternative arrangement for the end of the structured cabling system remote from the multiple jack assembly is shown. The arrangement shown in FIG. 6 may be used instead of the arrangement shown in FIG. 2. In the FIG. 6 arrangement, six individual jacks 20A-20F are respectively connected using conventional IDC connectors to respective data cables 21A-21F which are laid about a strain relief element 22. The data cables 21A-21F and strain relief element 22 together form a composite cable 23. The individual jacks 20A-20F are mounted on a protective enclosure 24, which protects the terminations of the data cables 21A-21F to the respective jacks 20A-20F. The protective enclosure 24 is mechanically secured by a suitable clamp 25 to the composite cable 23. Preferably, the strain relief element 22 is secured directly to the protective enclosure 24. As a result, a pulling force may be exerted on the cable 23 by grasping the protective housing 24 and pulling. The individual connections between the data cables 21A-21F and the individual jacks 20A-20F are isolated from such pulling forces by virtue of the connection between the strain relief element 22 and the protective enclosure 24 and by virtue of the clamp 25. With the arrangement of FIG. 6, when the cabling system has been run to the correct position, the jacks 20A-20F and the protective enclosure 24 are snap fitted as a unit into a suitable housing, for example a suitable floor box. To this end, snap-fit latches 26 are preferably provided as part of the individual jack/protective enclosure assembly.

In an alternative embodiment (not shown), the ends of the cables remote from the multiple jack assembly are not terminated to jacks. Accordingly, the structured cabling system as supplied comprises a plurality of cables [aeh] *each* terminated to a multiple jack assembly, the cables being bundled with a strain element to enable the bundle cable to be drawn into the required position. With such an arrangement, individual termination is necessary on site, but such termination is restricted to the ends of the data cable remote from the comms cabinet or room.

In yet a further alternative embodiment both ends of the cable are terminated in multiple jack assemblies each substantially identical to the other. Both multiple jack assemblies are preferably of the form illustrated in FIG. 1. With such an arrangement, both multiple jack assemblies will be secured to respective housings either within the same rack structure or within different rack structures, possibly in different comms rooms. Such an arrangement will allow very rapid establishment of data connections between rack systems.

It is envisaged that, in many instances, each cable assembly will be manufactured to a specific length determined by the particular installation. Such specific lengths may be identified by site survey or from scaled plans of the proposed installation site. It is envisaged, however, that cable assemblies may be manufactured in a range of predetermined standard lengths. It is expected that manufacture of assemblies to predetermined standard lengths will be somewhat more economic than individual manufacture to specific lengths and in the circumstances where standard length cables may be utilized for a particular installation this may provide a more economic solution to the installation problem than the use of individually manufactured cables.

Figure 7:
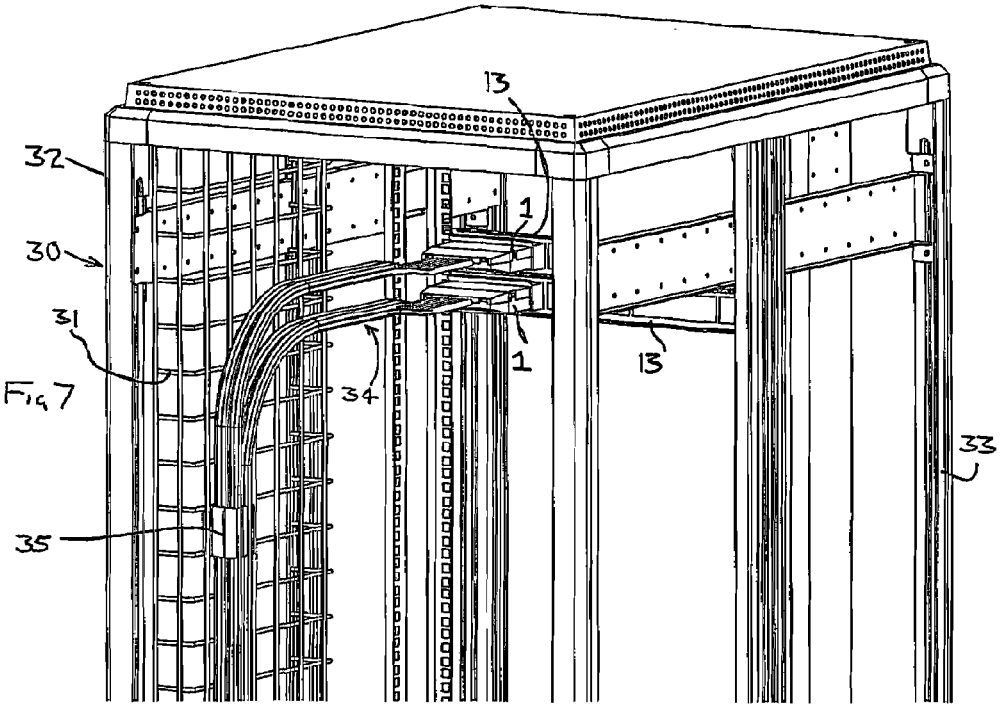
FIG. 7 illustrates a Comms cabinet for use with the arrangements for FIGS. 1-6.

Referring now to FIG. 7, there is shown a schematic view or part of a Comms cabinet suitable for use with the system described above. For the purposes of illustration only two multiple jack assemblies 1 are illustrated mounted on respective housings 13. It will be appreciated that, in a typical installation, there will be a large number of housings 13 each of which will accommodate several multiple jack assemblies. The illustrated Comms cabinet 30 comprises, in addition, a plurality of wire grids 31. Only one such grid 31 is illustrated in FIG. 7, but it will be appreciated that, in general, both sides 32, 33 of the Comms cabinet will be furnished with such grids. In addition, intermediate grids may be located in a central region of the cabinet The grids 31 provide a convenient means for locating the data cables 34 of the structured cabling system illustrated. To his end, purpose designed clips 35 may be secured to the grids (eg by snap fitting) and provide clip structures for receiving the data cables 34. Conveniently, each clip 35 may include one or more clipping areas each of which is adapted to receive the data cables of one structured cabling system. Using such a grid and clip arrangement cable management within the comms cabinet 30 may quickly and easily be effected. If additional local restraint of cables within the comms cabinet is required, or if the comms cabinet is intended to include cabling other than the structured cabling system described above, the grids 31 provide a convenient means whereby cables may be secured by means of clips or cable ties.

Whilst the invention has been described with particular reference to copper cabled arrangements it will be appreciated that the principles of the present invention may be applied to optical fibre arrangements if an optical fibre system is required.

The invention claimed is:

1. A structured cabling system comprising:

a plurality of individual data cables, each data cable defining opposite first and second ends and including eight separate wires, a multiple jack assembly containing a plurality of first jacks, a separate first jack being associated with a separate data cable, all eight wires at a first end of each data cable being electrically connected to the same associated first jack, a plurality of second jacks, a separate second jack being associated with a separate data cable, all eight wires at a second end of each data cable being electrically connected to the same associated second jack, and a protective enclosure surrounding said plurality of second jacks.

2. A structured cabling system according to claim 1, wherein the multiple jack assembly includes a housing into which said first end of each of said plurality of individual data cables extends, said housing enabling the first ends of said plurality of individual data cables to be pulled to a desired location without creating strain on connections between the wires thereof and respective first jacks.

3. A structured cabling system according to claim 2, wherein said first jacks are aligned in a row within said housing.

4. A structured cabling system according to claim 1, including means to mount said multiple jack assembly in a support housing at the desired location.

5. A structured cabling system according to claim 1, wherein said first jacks are RJ45 jacks.

6. A structured cabling system according to claim 1, wherein each said individual data cable includes a strain-relief element which extends from said multiple jack assembly to said protective enclosure and around which the wires thereof are wrapped.

7. A structured cabling system according to claim 1, wherein the protective enclosure includes a clamp which clamps said second ends of said plurality of individual data cables and enables pulling of said plurality of individual data cables without creating [stain] *strain* on connections between the wires thereof and respective second jacks.

8. A structured cabling system according to claim 7, wherein said protective enclosure includes a base and a cover which can be snap-fit to the base.

9. A structured cabling system according to claim 8, wherein said second jack are RJ45 jacks which accept respective RJ45 plugs to electrically connect wires in each plug exclusively with the wires in the jack in which it is mounted.

10. A structured cabling system according to claim 1, wherein each first jack is connected to a respective [integrated desktop connector] *insulation displacement connector* (IDC) and all eight wires at a first end of each data cable are attached to said respective IDC.

11. A structured cabling system according to claim 10, including a printed circuit board (PCB) on which all IDC's are attached.

12. A method of installing a structured cabling system at a use site which comprises the steps of (a) providing a [structure] *structured* cabling system which includes a plurality of individual data cables, each data cable defining opposite first and second ends and including eight separate wires, a multiple jack assembly containing a plurality of first jacks, a separate first jack being associated with a separate data cable, all eight wires at a first end of each data cable being electrically connected to the same associated first jack, a plurality of second jacks, a separate second jack being associated with a separate data cable, all eight wires at a second end of each data cable being electrically connected to the same associated second jack, and a protective enclosure surrounding said plurality of second jacks, (b) delivering said structured cabling system to the use site, (c) conveying said multiple jack assembly to a first location at said use site for installation in a support housing, and (d) conveying said protective enclosure with second jacks to a second location at said use site for installation of at least one of said second jacks at said second location.

13. A method according to claim 12, including removing said second jacks from said protective enclosure and installing said second jacks at at least two separate locations.

* * * * *